FIG. 1. PRIOR ART STEREO POWER OUTPUT SYSTEM UTILIZING PUSH-PULL, LIKE-CONDUCTIVITY, SINGLE-ENDED, CAPACITIVELY-COUPLED CIRCUITS.
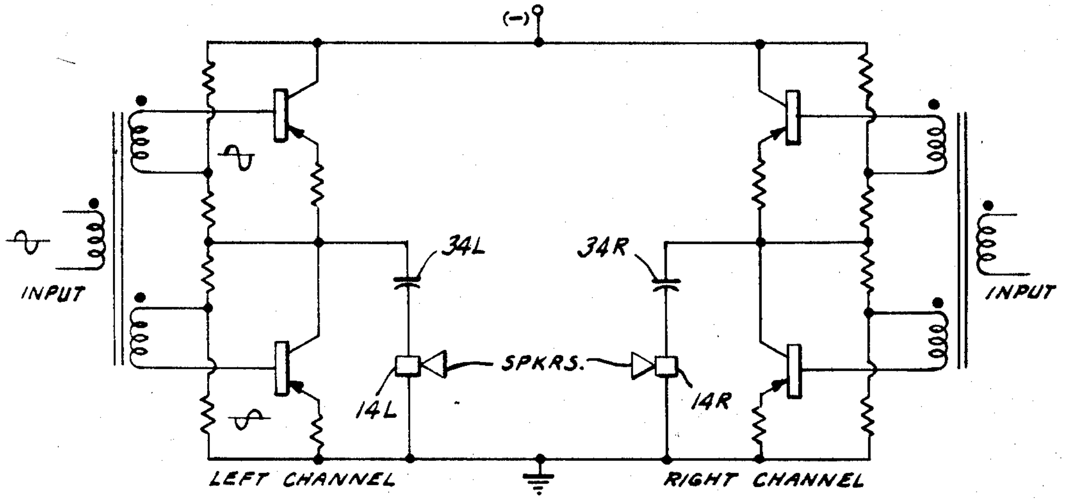
FIG. 2. DUAL CHANNEL SYSTEM WITH COMMON LOAD COUPLING CAPACITY
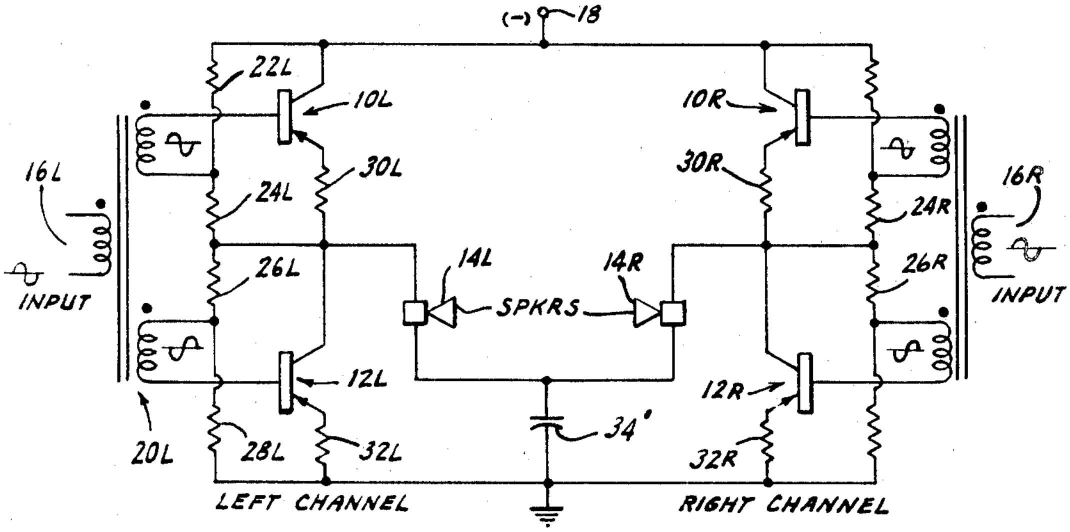
INVENTORS
ALBERT HOPENGARTEN
RICHARD F. WOOD
BY
D R Pressman
ATTORNEY July 23, 1968 A. HOPENGARTEN ET AL 3,394,227

STEREOPHONIC POWER AMPLIFIER

Filed Dec. 21, 1964 2 Sheets-Sheet 2

INVENTORS
ALBERT HOPENGARTEN
RICHARD F. WOOD
BY
D R Pressman
ATTORNEY 3,394,227

STEREOPHONIC POWER AMPLIFIER

Albert Hopengarten, Lafayette Hills, Pa., and Richard F. Wood, Marlton, N.J., assignors to Philco-Ford Corporation, a corporation of Delaware Filed Dec. 21, 1964, Ser. No. 419,823
15 Claims. (Cl. 179—1)

ABSTRACT OF THE DISCLOSURE

Stereo power amplifier using two push-pull like-conductivity, single-ended transistor stages with one output terminal of each stage connected to one terminal of a corresponding speaker and the other output terminals of said stages connected together and to the other terminals of the two speakers via a single load coupling capacitor. Input terminals of both stages may be biased by means of common bias resistor network, and bypass capacitors may be provided in said network to reduce crosstalk.

This invention relates to transistorized power amplifying systems and particularly to such systems employing multiple amplifiers and multiple speaker loads.

A popular type of transistorized monophonic power output amplifier is the push-pull, like-conductivity, single-ended, capacitively-coupled circuit. In this circuit a single power supply source is connected across two like-conductivity transistors whose emitters and collectors are connected in series. The two transistors are driven in push-pull, and the outputs of both transistors are connected in common to a single end of the load impedance via a coupling capacitor. The capacitor which couples the outputs of both transistors to the load must have a very high value of capacitance in order that the voltage across the capacitor will not change appreciably over one cycle of the lowest frequency to be amplified.

In stereophonic systems, wherein two separate amplifiers and two separate speaker systems of the type aforedescribed are utilized, it will be apparent that two of the aforenoted large coupling capacitors are required. Obvious advantages would therefore accrue if this requirement for two separate coupling capacitors could be eliminated.

*Objects*

Accordingly the objects of the present invention are:

(1) To provide a new and improved power output system, (2) To provide a dual channel stereophonic power output system of the single-ended, like-conductivity, push-pull type wherein only one large coupling capacitor is required, (3) To reduce the weight, cost and size of a stereo amplifying system;

(4) To provide, in one embodiment, an improved dual channel, single-ended, push-pull system requiring only one bias supply network for the two channels.

Other objects and advantages of the present invention will become apparent from a consideration of the following description thereof.

*Summary*

According to one preferred form of the present invention, a power output system utilizes a plurality of push-pull, like-conductivity, single-ended, output amplifiers, each connected to one side of one of a respective plurality of load impedances. The other ends of the load impedances are connected to a common load coupling capacitor.

*Drawings*

In the drawings, wherein like parts are designated throughout with like reference numerals, and wherein left stereo channel components are suffixed with an "L" and right channel components are suffixed with an "R."

FIG. 1 shows a prior art stereo power output system;

FIG. 2 shows a stereo output system according to the present invention;

FIG. 1.—PRIOR ART STEREO POWER OUTPUT SYSTEM

Figure 3:
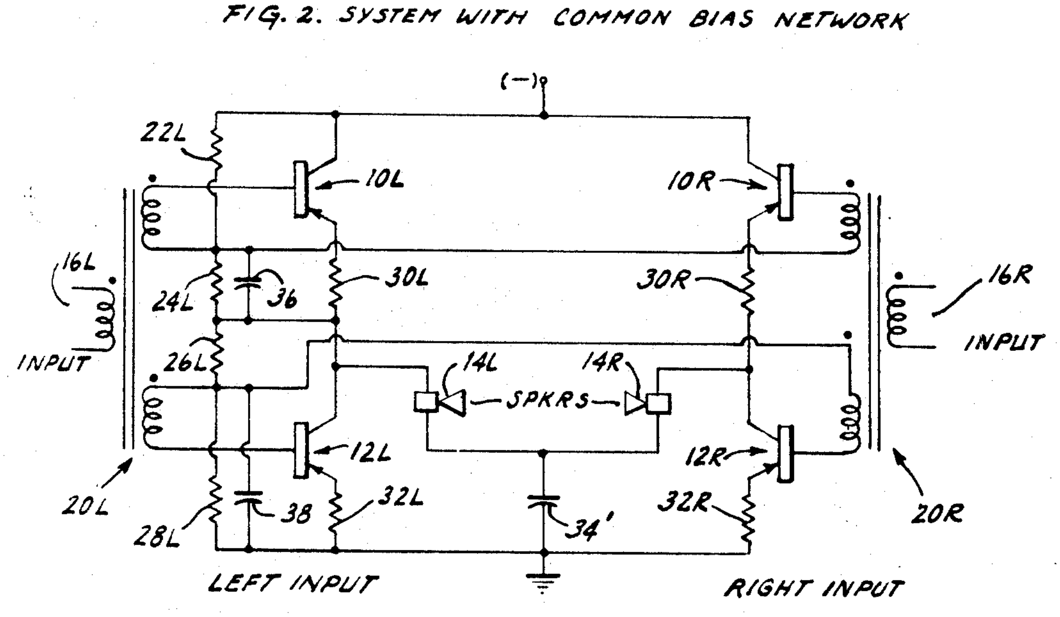
FIG. 3 shows a stereo output system according to the present invention which is a modification of the system of FIG. 2.

FIG. 1 shows a prior art stereo power output system utilizing like-conductivity transistors driven in push-pull whose outputs are capacitively connected to the same end of the load. Two complete amplifying systems are shown; one for the left channel, and one for the right channel. It will be noted that the system of FIG. 1 requires two large coupling capacitors, 34R and 34L, for coupling the two speakers, 14R and 14L, to the outputs of their respective amplifiers.

FIG. 2.—STEREO AMPLIFIER SYSTEM WITH COMMON LOAD COUPLING CAPACITOR

*Description*

The system of FIG. 2 according to the present invention includes separate left and right channel amplifiers and speakers. The left channel signal is applied at input winding 16L for amplification by transistors 10L and 12L in order to drive speaker 14L. The right channel signal is applied to winding 16R and is amplified by transistors 10R and 12R for driving speaker 14R. Excluding capacitor 34', which is common to both channels the left and right channels have identical circuitry; hence only the left will be specifically described.

The left stereo input signal is applied to winding 16L of a three-winding transformer 20L whose upper and lower output windings are arranged to drive transistors 10L and 12L, respectively, in push-pull fashion. Transistors 10L and 12L have their collector-emitter circuits connected in series across bias source 18. The collector of transistor 10L is connected to the negative terminal of source 18, while the emitter of transistor 12L is connected to the ground terminal of source 18 via a first thermal stabilizing resistor 32L. The emitter of transistor 10L is connected to the collector of transistor 12L via a second thermal stabilizing resistor 30L. A string of four resistors, 22L, 24L, 26L, and 28L are also connected across bias source 18 to form a multivoltage bias network. One terminal of the upper output winding of transformer 20L is connected to the junction of resistors 22L and 24L, while one terminal of the lower output winding is connected to the junction of resistors 26L and 28L. The other terminals of the two output windings are connected to the bases of transistors 10L and 12L, respectively. Also the junction of resistors 24L and 26L is connected to the junction of resistor 30L and the collector of transistor 12L. Preferably the potential at this point is approximately one half the potential supplied by source 18.

The junction of resistor 30L and the collector of transistor 12L is also connected to one terminal of speaker 14L, while in the right channel, the junction of resistor 30R and transistor 12R is similarly connected to one terminal of speaker 14R. The other terminals of speakers 14L and 14R are connected together to one terminal of a common coupling capacitor 34', the other terminal of which is connected to ground.

*Operation*

The system of FIG. 2 operates in the following manner. Capacitor 34' will be charged to approximately half the voltage of source 18 inasmuch as it is connected, via speakers 14, to the junctions of resistors 24 and 26. Assume that a sine wave is applied to the left hand input winding 16L. During the first half or positive excursion of said sine wave, the upper output winding of transformer 20L will supply an in-phase version of the input signal to the base of the transistor 10L, causing the base to be more positive than the emitter. This will cut off transistor 10L. The lower output winding of transformer 20L will supply an opposite-phase version of the input voltage to transistor 12L, causing the base thereof to be less positive than the emitter. This will turn on transistor 12L during the first half cycle. Transistor 12L will accordingly draw current proportional to the amplitude of the first half cycle of the input signal from capacitor 34' through speaker 14L.

During the second half cycle of the input signal transistor 12L will be cut off and transistor 10L will be conductive, allowing a current proportional to the amplitude of the second half cycle of the input signal to flow from source 18, through transistor 10L, resistor 30L, and speaker 14L, into capacitor 34'. Capacitor 34' will thus act effectively as a source arranged to supply half the voltage of source 18. Power amplification will have occurred since the current flowing through speaker 14L will be proportional to, yet of a far greater magnitude than the input current.

When a signal is applied to the right input 16R, an analogous analysis will be applicable. When signals are applied to both inputs 16L and 16R simultaneously, capacitor 34' will act as a power source for both channels simultaneously. There will be no significant crosstalk between left and right channels since capacitor 34' has a large value, thus providing a very low impedance for alternating current signals. Accordingly there will be no significant signal voltage developed across capacitor 34'. No appreciable direct current will flow through speakers 14L and 14R since the DC potentials at the upper terminals of speakers 14L and 14R will be substantially identical.

Resistors 30 and 32, in the emitter circuits of transistors 10 and 12, respectively, serve to add stability to their transistors to prevent thermal runaway. Resistors 30 and 32 may be omitted under most operating conditions.

Similarly the method of driving the output transistors may vary from that shown so long as the bases of the transistors are biased at the correct direct current level, and push-pull signals are applied to the inputs of both transistors. Speakers 14 may, of course, represent multiple speaker systems, rather than a single speaker such as is illustrated. Various other modifications may be made within the scope of the invention. For instance, feedback circuitry (not shown) may be added from the collectors of transistors 12 back to the input of the driver stage.

While the system has been described with reference to stereophonically related signals, it will be apparent that any plurality of signals, related or unrelated may be amplified by the system of FIG. 2. Also more than two amplifiers may share the common coupling capacitor if desired.

A system substantially shown in FIG. 2 was constructed and operated satisfactorily with components having the following values.

| Component: | Value |
|---|---|
| Resistor **22** | 560 ohms. |
| Resistors **24** and **28** | 33 ohms. |
| Resistor **26** | 680 ohms. |
| Resistors **30** and **32** | 2.7 ohms. |
| Capacitor **34'** | 200 $\mu$f. |
| Source **18** | 34 v. |
| Speaker **14** | 1 8-inch (32 ohms) paralleled by 1 4-inch (64 ohms) in series with a .22 $\mu$f capacitor. |

FIG. 3.—FIG. 2 SYSTEM WITH COMMON-BIAS NETWORK

In the system of FIG. 3, resistors 22R, 24R, 26R, and 28R, which were found in FIG. 2, have been eliminated.

In FIG. 3 the ends of the secondary windings of transformer 20R remote from the bases of transistors 10R and 12R are connected to the junctions of resistors 22L and 24L and 26L and 28L. In other words, a single chain of resistors establishes the bias potentials for both output stages of the stereo system. This can be done since the output bias potentials of both stages are identical. Ignoring optional capacitors 36 and 38 for the moment, the use of the common-bias network of FIG. 3 will deteriorate the stereo separation vis-a-vis the system of FIG. 2 since signal current from both left and right channels will flow in resistors 24L and 28L. This reduction in stereo separation is not intolerable however. When resistors 24L and 28L are bypassed with capacitors 36 and 38, respectively, as shown, the cross feed of signals from each channel to the other will be greatly reduced and a substantial improvement in separation will result.

While there has been described what is at present considered to be the preferred embodiment of the invention it will be apparent that various modifications and other embodiments thereof will occur to those skilled in the art within the scope of the invention. Accordingly, it is desired that the scope of the invention be limited by the appended claims only.

We claim:

1. In combination:

(a) a source of direct current, (b) at least two pair of transistors, the collector of one transistor of each pair and the emitter of the other transistor of each pair being coupled to opposite terminals of said source, the emitter of said one transistor of each pair being coupled to the collector of said other transistor of each pair to form a junction in each pair, (c) means for supplying a separate driving signal to each pair of transistors, each signal being supplied in push-pull fashion to the two transistors of a pair, (d) two load impedances, one end terminal of each being connected to one of said junctions, and (e) a capacitor connected between one terminal of said source and a junction formed by interconnecting the other terminals of said load impedances.

2. The combination of claim 1 wherein said load impedances are loudspeakers and said transistors are PNP-type devices.

3. The combination of claim 1 wherein said means of clause (c) comprises a transformer for each pair of transistors, each transformer having a single input winding and two output windings.

4. The combination of claim 3 including a resistive bias network for each pair of transistors, each bias network comprising first, second, third, and fourth resistors connected in a series string across said source, one terminal of one output winding of each of said transformers being connected to the junction of said first and second resistors of a respective network, and one terminal of the other output winding of each of said transformers being connected to the junction of said third and fourth resistors of said respective network, the other terminals of said output windings being connected to the respective bases of a respective pair of transistors.

5. In combination:

(a) a plurality of load impedances, each having first and second end terminals, said second end terminals being connected together to form a first junction, (b) a capacitive reactance and a source of potential having first and second end terminals, said first junction being connected to the second end terminal of said source via said capacitive reactance, and (c) a corresponding plurality of amplifying circuits, each comprising first and second devices capable of providing a variable impedance between first and second terminals thereof in response to a signal, the first terminals of said first devices being connected to said first terminal of said source, the second terminals of said second devices being connected to said second terminal of said source, the second terminal of each of said first devices and the first terminal of each of said second devices being connected together to form a plurality of second junctions, said second junctions being connected to the respective first terminals of said plurality of load impedances.

6. The combination of claim 5 wherein each of said circuits includes first and second stabilizing resistors, said first resistor being connected between the second terminal of said first device and the first terminal of said second device, said second resistor being connected between the second terminal of said second device and the second terminal of said source.

7. The combination of claim 5 including a corresponding plurality of signal sources and means for supplying a signal from each of said sources to the first and second devices of a respective one of said circuits in opposite phase.

8. The combination of claim 7 wherein said devices are transistors, said load impedances are loudspeakers, and said means comprises a plurality of transformers, each having an input winding and two output windings.

9. The combination of claim 8 including a corresponding plurality of resistive bias networks connected to said source, each arranged to provide reference voltages for the output windings of one of said transformers.

10. The combination of claim 8 including a single resistive bias network connected to said source and arranged to provide reference voltages for the output windings of all of said plurality of transformers.

11. The combination of claim 8 wherein said plurality is two in number and said signal sources are stereophonically related.

12. A stereo power amplifying system comprising, in combination:

(a) left and right audio transducers, each having first and second terminals, the second terminals of each being connected together to form a junction, (b) a source of direct current potential having a first terminal and a second terminal, (c) left and right power amplifiers, each including first and second transistors of like conductivity type, the collector of each first transistor connected to the first terminal of said source and the emitter of each second transistor direct current coupled to said second terminal of said source, the collector of each second transistor direct current coupled to the first terminal of its corresponding transducer and to the emitter of said first transistor, (d) a capacitor connected between said junction and said second terminal of said source, and (e) means for supplying a separate driving signal to each of said power amplifiers, each signal being supplied in opposite phase to the first and second transistors of its respective amplifier.

13. The combination of claim 12 wherein said means comprises left and right resistive bias networks and left and right transformers, each bias network comprising first, second, third, and fourth resistors connected in a series string between the first and second terminals of said source, each transformer including an input and two output windings, one terminal of each of said output windings of the left transformer connected to the bases of said first and second transistors, respectively, of the left power amplifier, the other terminal of one of said output windings of the left transformer connected to the junction of said first and second resistors of the left bias network, and the other terminal of the other of said output windings of said left transformer connected to the junction of said third and fourth resistors of said left bias network; said right bias network, said right transformer, and said right power amplifier being connected in the same manner as said left bias network, said left transformer, and said left power amplifier.

14. The combination of claim 12 wherein said means comprises two transformers and a single resistive bias network comprising first, second, third, and fourth resistors connected in a series string between the first and second terminals of said source, each of said transformers including an input and first and second output windings, one terminal of said first and second output windings of said left transformer connected to the bases of said first and second transistors, respectively, of said left power amplifier, one terminal of said first and second output windings of said right transformer connected to the bases of said first and second transistors, respectively, of said first and second transistors, respectively, of said right power amplifier, the other terminal of said first output windings of said left and right transformers connected to the junction of said first and second resistors and the other terminal of the said second output windings of said left and right transformers connected to the junction of said third and fourth resistors.

15. The combination of claim 14 further comprising first and second bypass capacitors connected in shunt with said second and fourth resistors, respectively.

References Cited

UNITED STATES PATENTS 3,281,535 10/1966 Reiffin ............... 179—1

OTHER REFERENCES

RCA Transistor Manual, 1961, pp. 27–28.

Valkenburg, M. E.: Network Analysis, Prentice-Hall, 1955, p. 207.

KATHLEEN H. CLAFFY, *Primary Examiner.*

R. LINN, *Assistant Examiner.*